United States Patent
Matsuyama et al.

(10) Patent No.: US 7,239,359 B2
(45) Date of Patent: Jul. 3, 2007

(54) DIGITAL BROADCASTING RECEIVER

(75) Inventors: Hideto Matsuyama, Osaka (JP); Eiichi Itani, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 542 days.

(21) Appl. No.: 10/303,694

(22) Filed: Nov. 26, 2002

(65) Prior Publication Data

US 2003/0101453 A1  May 29, 2003

(30) Foreign Application Priority Data

Nov. 29, 2001 (JP) .............................. 2001-363618

(51) Int. Cl.
*H04N 5/44* (2006.01)

(52) U.S. Cl. .................... 348/732; 348/725; 348/553; 348/461; 725/50

(58) Field of Classification Search ............... 348/732, 348/730, 731, 553, 558, 569, 570, 552, 725, 348/729, 720, 719, 460, 461; 725/50, 38, 725/39, 53
See application file for complete search history.

(56) References Cited

U.S. PATENT DOCUMENTS

| | | | | |
|---|---|---|---|---|
| 5,329,500 A * | 7/1994 | Baik et al. ..................... 368/10 |
| 5,561,461 A * | 10/1996 | Landis et al. ................ 348/725 |
| 5,917,481 A * | 6/1999 | Rzeszewski et al. ........ 715/721 |
| 6,169,580 B1 * | 1/2001 | Shin et al. ................... 348/460 |
| 6,209,131 B1 * | 3/2001 | Kim et al. .................... 725/50 |
| 6,337,719 B1 * | 1/2002 | Cuccia ........................ 348/731 |
| 6,477,705 B1 * | 11/2002 | Yuen et al. .................... 725/41 |
| 6,552,752 B1 * | 4/2003 | Tsuji et al. ................. 348/730 |
| 6,741,288 B1 * | 5/2004 | Kessler .................... 348/385.1 |
| 6,785,903 B1 * | 8/2004 | Kuh ............................. 725/50 |

FOREIGN PATENT DOCUMENTS

| | | |
|---|---|---|
| JP | 06-276500 | 9/1994 |
| JP | 08-101289 | 4/1996 |
| JP | 11-164295 | 6/1999 |
| JP | 11-261906 | 9/1999 |
| JP | 11-355749 | 12/1999 |
| JP | 2001-230689 | 8/2001 |

OTHER PUBLICATIONS

Office Action issued by the Japanese Patent Office dated Jan. 24, 2006.
Office Action from the Japanese Patent Office dated Apr. 27, 2006 in corresponding Japanese patent application.

* cited by examiner

*Primary Examiner*—David Ometz
*Assistant Examiner*—Jean W. Désir
(74) *Attorney, Agent, or Firm*—Westerman, Hattori, Daniels & Adrian, LLP.

(57) ABSTRACT

A tuner extracts a digital broadcasting wave on a channel tuned in to, and demodulates the extracted digital broadcasting wave, to output a transport stream. A demultiplexer acquires various types of data from the transport stream. A CPU performs channel search processing when the timing of execution previously set has arrived (e.g., 4:00 a.m. on Thursday every week), and performs processing for acquiring channel information included in the digital broadcasting wave and storing, when a new channel is found, for example, channel information related to the new channel in a non-volatile memory.

12 Claims, 4 Drawing Sheets

Fig. 2A

```
CHANNEL INFORMATION UPDATING SETTING

EVERY DAY        TIME  ___ : ___

| EVERY WEEK      WEDNESDAY  21 : 00 |

EVERY MONTH   DAY ___   TIME  ___ : ___
```

Fig. 2B

```
           TIME SETTING    ___ : ___
```

DIGITAL BROADCASTING RECEIVER

BACKGROUND OF THE INVENTION

Field of the Invention

The present invention relates to a digital broadcasting receiver that receives digital broadcasting. The digital broadcasting receiver that receives digital broadcasting using a satellite or a terrestrial wave selects any of a plurality of broadcasting waves received through a dedicated antenna or a terrestrial wave antenna using a tuner, selects any of a plurality of channels included in the selected broadcasting wave using demultiplex processing, extracts a digital signal on the selected channel, and decodes the extracted digital signal, to output a video/audio signal.

In such a digital broadcasting receiver, channel search processing is performed as initial setting when the receiver is installed, to acquire channel information. Further, in the initial setting, the current date is given to an internal clock of the receiver by a user's entry operation.

In the above-mentioned conventional digital broadcasting receiver, however, after a channel search is made at the time of the initial setting, the channel search processing is not performed unless a user issues a channel search instruction to the receiver, and information remains old unless the user issues the instruction. Therefore, the start of new broadcasting cannot be presented to the user. With respect to the time on the internal clock, there is also such discontent that the internal clock cannot tick the correct time because errors are accumulated unless the user diligently gives the current time after the initial setting.

SUMMARY OF THE INVENTION

In view of the foregoing circumstances, an object of the present invention is to provide a digital broadcasting receiver capable of automatically updating data.

In order to solve the above-mentioned problem, a digital broadcasting receiver according to the present invention is characterized by comprising means for acquiring various types of data included in a digital broadcasting wave; storage means for storing the various types of data; and means for acquiring the various types of data included in the digital broadcasting wave when the timing of execution has arrived to perform data updating processing.

In the above-mentioned configuration, even if a user does not specially issue a command to the receiver, the various types of data are automatically updated.

The digital broadcasting receiver may be so configured that a channel search is made when the timing of execution has arrived, and data updating processing is performed on the basis of data acquired by the channel search.

The digital broadcasting receiver may be so configured that time data is acquired and stored as the various types of data, and the time on an internal clock is updated on the basis of the time data.

Furthermore, the digital broadcasting receiver may be so configured that the timing of execution is set by user's entry.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2A is an explanatory view showing an execution timing setting screen of automatic channel search and information acquisition updating processing;

FIG. 2B is an explanatory view showing a time setting screen;

DESCRIPTION OF THE PREFERRED EMBODIMENTS

Figure 1:
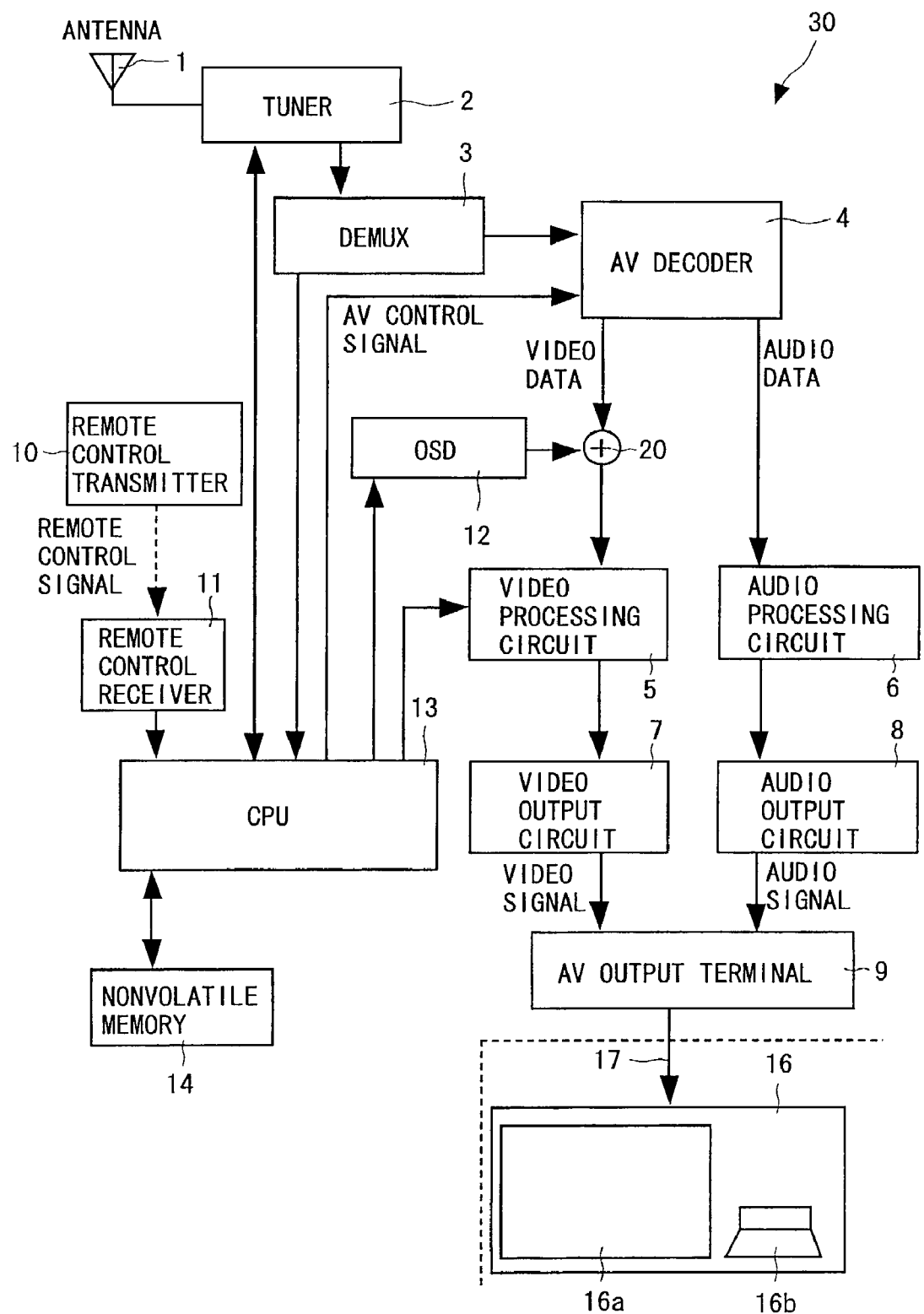
FIG. 1 is a block diagram showing a digital broadcasting receiver 30 according to an embodiment.

An embodiment of the present invention will be described on the basis of FIGS. 1 to 4. Here, a case where a user views terrestrial wave digital broadcasting is illustrated.

An antenna 1 is arranged in a predetermined direction outdoors, and receives a digital broadcasting signal fed from a terrestrial wave broadcasting station.

A tuner 2 extracts, out of high-frequency digital modulation signals including video/audio data, the signal having a particular frequency. The tuner 2 comprises a demodulation circuit, an inverse interleave circuit, an error correcting circuit, and so on, thereby demodulating the selected digital modulation signal to output a transport stream.

A demultiplexer (DEMUX) 3 separates the transport stream into a video stream and an audio stream based on MPEG2 (Moving Picture Experts Group2) and PSI/SI/EIT (Program Specific Information/Service Information/Event Information Table).

The demultiplexer 3 feeds the video stream and the audio stream to an AV decoder 4, and feeds to a CPU 13 program information (the name of a program, the time when the program begins, a time period during which the program is continued, information related to the contents of the program, information related to a genre of the program, etc.), for example, included in the PSI/SI.

As described above, a plurality of channels are multiplexed on the transport stream. Processing for selecting any of the channels can be performed by extracting from the above-mentioned PSI/SI data indicating which packet ID in the transport stream is used to multiplex the arbitrary channel.

The AV decoder 4 comprises a video decoder for decoding the video stream and an audio decoder for decoding the audio stream. The video decoder decodes an inputted variable length code to find a quantization factor and a motion vector, thereby carrying out inverse DCT (Discrete Cosine Transformation), motion compensation control based on the motion vector, and the like. The audio decoder decodes an inputted coded signal, to produce audio data.

Video data produced by the video decoder is outputted to a video processing circuit 5, and the audio data is outputted to an audio processing circuit 6.

The video processing circuit 5 receives the video data from the AV decoder 4 and subjects the received video data to digital-to-analog (D/A) conversion, to convert the video data into a composite video signal, for example. The audio processing circuit 6 receives the audio data outputted from the AV decoder 4 and subjects the received audio data to digital-to-analog (D/A) conversion, to generate an analog signal of a right (R) sound and an analog signal of a left (L) sound, for example.

Each of a video output circuit 7 and an audio output circuit 8 comprises an output resistor, an amplifier, and so on. An AV output terminal 9 is provided with an output unit (a set of a left/right audio output terminal or the like and a video output terminal or the like), and a monitor 16 comprising a CRT (Cathode Ray Tube) 16a and a speaker 16b is connected to the output unit by a video/audio code 17.

An OSD (On-Screen Display) circuit 12 outputs to an adder 20 video data based on character information and color information which those are instructed to output from the CPU 13. The adder 20 performs processing for incorporating the above-mentioned video data into the received video data outputted from the AV decoder 4. By the OSD circuit 12, display of EPG (Electronic Program Guide) based on the above-mentioned program information received by the CPU 13, display of an automatic execution date information input screen for a channel search (see FIG. 2A), display of a time input screen (see FIG. 2B) etc. can be performed.

A remote control transmitter 10 is a transmitter for sending out a command to the digital broadcasting receiver 30. When a key (not shown) provided in the remote control transmitter 10 is operated, signal light (a remote control signal) meaning a command corresponding to the key is sent out from a light emitter (not shown). A remote control light receiver 11 receives the signal light, converts the received signal light into an electric signal, and feeds the electric signal to the CPU 13.

A nonvolatile memory (e.g., EEPROM (Electrically Erasable and Programmable ROM)) 14 stores EPG data (program information) for displaying the EPG screen or the like, channel information, information related to the date on which a channel search is automatically executed, etc.

Although the CPU 13 carries out overall control in the digital broadcasting receiver 30, automatic channel search and information acquisition updating processing and automatic internal clock correction processing are particularly performed as control according to the present invention. In the present embodiment, a user is caused to set the execution date (including time) in order to perform the automatic channel search and information acquisition updating processing. Although a screen for the setting can be set by a method such as an arbitrary time of every day, an arbitrary time of an arbitrary day of every week, and an arbitrary time of an arbitrary day of every month, as shown in FIG. 2A, for example, the present invention is not limited to such a form. The CPU 13 stores in the non-volatile memory 14 information related to the set date inputted by the user on the screen. The above-mentioned screen is displayed by designating an item "various types of setting" on a menu screen (not shown), for example. In order to initially set an internal clock (a calendar functional unit) of the receiver 30, a time input screen shown in FIG. 2B is displayed. When the user enters a time into the screen, the internal clock starts counting, to output the time information.

Figure 3:
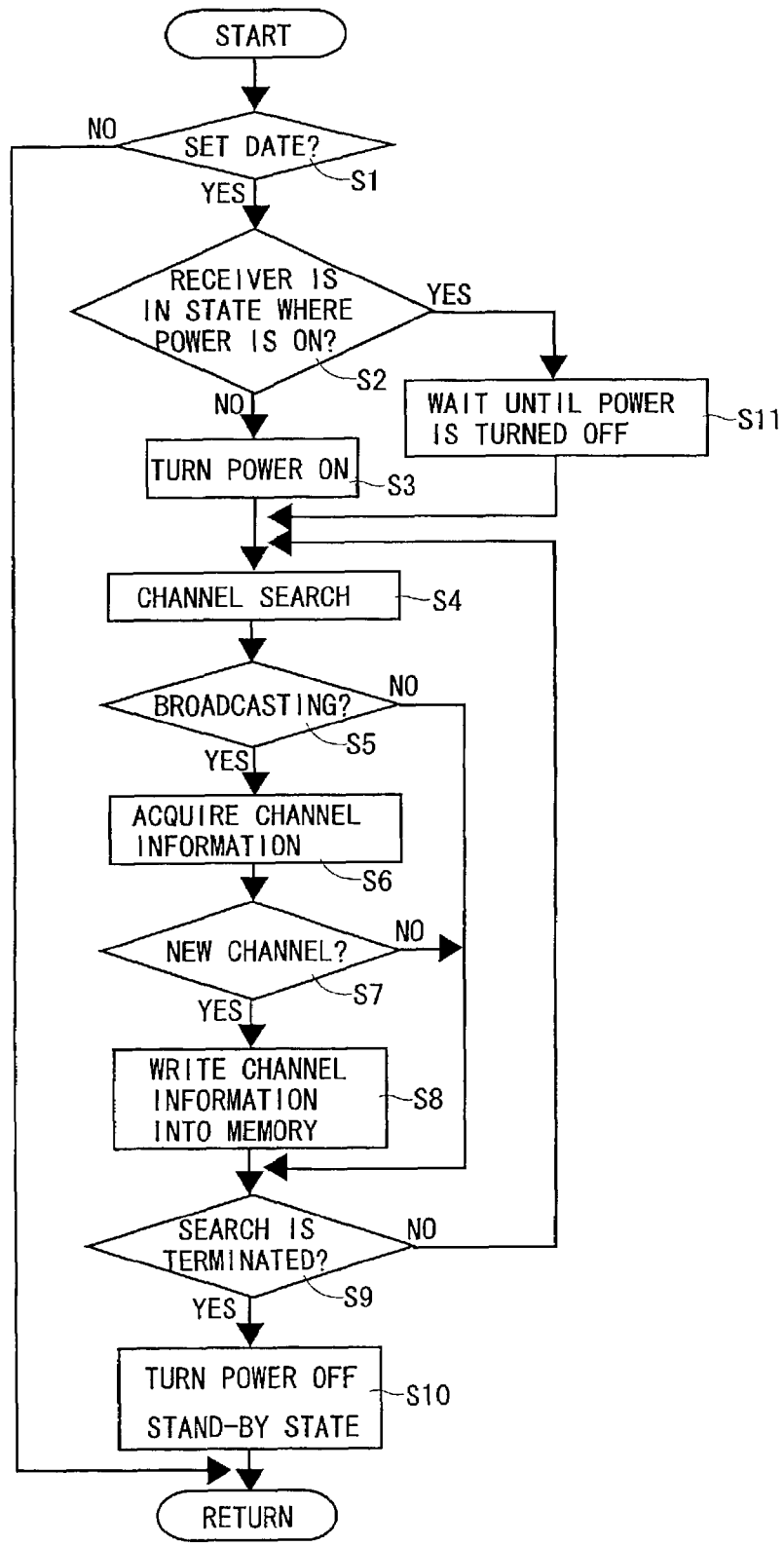
FIG. 3 is a flow chart showing automatic channel search and information acquisition updating processing.

FIG. 3 is a flow chart showing the contents of the automatic channel search and information acquisition updating processing. The CPU 13 acquires information related to the current date fed from the internal clock, to judge whether or not the set date has arrived (step S1). When the set date has arrived, it is judged whether or not the receiver 30 is in a state where the power supply is on (a television is on) (step S2). The CPU 13 performs processing for turning the power supply on if the power supply to the receiver 30 is not on (in a case where the receiver 30 is in a stand-by state) (step S3). Thereafter, the processing proceeds to channel search processing (step S4).

On the other hand, the CPU 13 waits until the operation for turning the power supply off is performed when the receiver 30 is in a state where the power supply is on (step S11). Thereafter, the processing proceeds to channel search processing (step S4). That is, the CPU 13 delays the start of a channel search, because the user may view a program when the receiver 30 is in a state where the power supply is on, until the viewing is terminated. The delay processing is exemplified. The CPU 13 may make a channel search even when the receiver 30 is in a state where the power supply is on. Further, when processing for turning the power supply on is performed (step S3), the power may not be supplied to the whole receiver 30 but supplied to only a circuit required for channel search or data updating processing.

The CPU 13 sets the lowest frequency, for example, in the tuner 2 and performs a channel selection operation to make a channel search (step S4), and judges the presence or absence of broadcasting (step S5). When the broadcasting is detected, information related to a channel on which the broadcasting exists is acquired (step S6). Examples of the channel information include information related to the name of a broadcasting station and information related to a frequency set in the tuner 2, for example, which can be acquired by receiving on the channel.

The CPU 13 judges whether or not the channel is a new channel on the basis of the channel information (step S7), and writes, if the channel is a new channel, information related to the channel into the non-volatile memory 14 (step S8).

In a case where it is judged in the step S7 that the channel is not a new channel, a case where it is judged in the step S5 that there is no broadcasting, and a case where the writing processing in the step S8 is performed, it is judged whether or not a channel search is terminated (step S9). When the channel search is not terminated, the program is returned to the step S4. In the step S4, the subsequent frequency is set in the tuner 2, to continue channel search processing. When channel searches are entirely terminated, the power supply to the receiver 30 is turned off (step S10). In the step S10, the receiver 30 enters a stand-by mode, thereby terminating the processing.

Although in the above-mentioned example, when the channel searched for is a new channel, information related to the channel is written, processing for overwriting all channel information including the channel information which has already been written may be performed. Although in FIG. 3, the automatic channel search and information acquisition updating processing are performed by judging whether or not the set date has arrived, it may be always performed when the power supply is turned off, for example, even if the date is not set. Further, it may be performed once per twenty times when the power supply is turned off. Such processing is realized by processing for counting the number of times the power supply is turned off and processing for judging whether or not the count value is 20.

Figure 4:
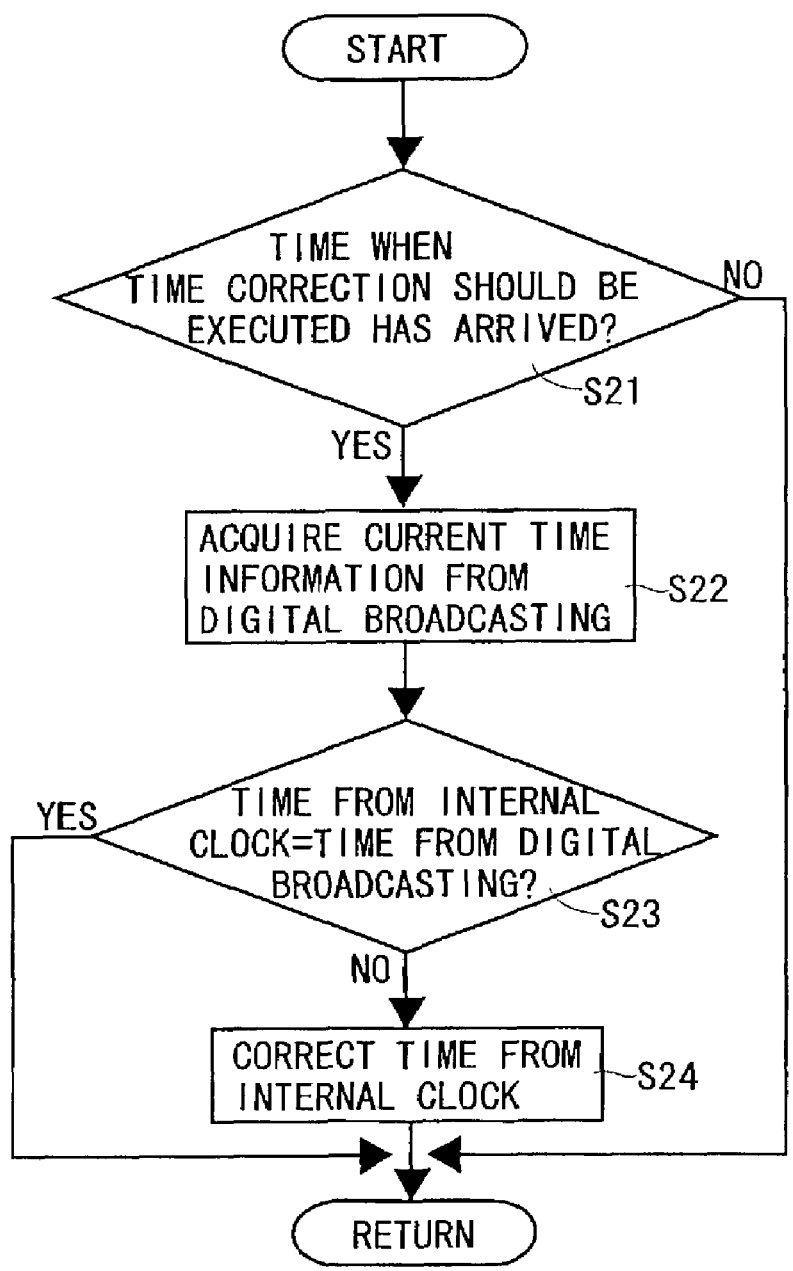
FIG. 4 is a flow chart showing time correction processing.

FIG. 4 is a flow chart showing the contents of the automatic internal clock correction processing. Herein, the time when automatic internal clock correction is executed can be set to the time when the power supply is turned on, the time when the power supply is turned off, or the time when a channel is changed, for example. Further, the internal clock may notify the CPU 13 that the time when correction should be executed has arrived for each hour, for example, for the CPU 13 to start processing in accordance with the notification. Further, the automatic internal clock correction may be executed in all arrivals of the conditions (the timing of setting time correction) or executed at several times of arrival. Even if the internal clock notifies the CPU 13 that the time when correction should be executed has arrived, the execution may be postponed without specially turning the power supply on when the receiver 30 is in a stand-by state (in a state where the power supply to the receiver 30 is off).

In the flow chart shown in FIG. 4, the CPU 13 judges whether or not the time when time correction should be executed has arrived (step S21). When the time when time correction should be executed has arrived, information related to the current time is acquired from digital broadcasting (step S22). Information related to the current time is received from the internal clock, and the current time is compared with the current time acquired from the digital broadcasting (step S23). When the times coincide with each other, correction processing is terminated. On the other hand, when they do not coincide with each other, the current time information acquired from the digital broadcasting is set in the internal clock again, to correct the time (step S24).

As described in the foregoing, in the digital broadcasting receiver according to the present embodiment, even if the user does not specially issue a command to the receiver 30, updating of channel information (addition of a new channel, etc.) and updating of time data (time correction) are automatically performed, thereby making it possible to present new channel information and perform various types of processing at the accurate time. Although the channel information and the time information are exemplified as a data updating object, data updating processing may be performed with respect to the other various types of data acquired from a digital broadcasting wave.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital broadcasting receiver comprising:
    means for acquiring various types of data included in a digital broadcasting wave;
    storage means for storing said various types of data and a timing of execution; and
    means for acquiring the various types of data included in the digital broadcasting wave when the stored timing of execution has arrived to perform data updating processing,
    wherein a channel search is made when said timing of execution has arrived, and data updating processing is performed on the basis of data acquired by the channel search, and
    said channel search includes automatically setting a tuner to a plurality of frequencies, judging the presence of broadcasting at each of the plurality of frequencies and acquiring channel information when broadcasting is detected.

2. The digital broadcasting receiver according to claim 1, wherein
    time data is acquired and stored as the various types of data, and the time on an internal clock is updated on the basis of the time data.

3. The digital broadcasting receiver according to claim 1, wherein said timing of execution is set by user's entry.

4. The digital broadcasting receiver according to claim 2, wherein said timing of execution is set by user's entry.

5. The digital broadcasting receiver according to claim 1, wherein the timing of execution is the time when the power supply is turned off.

6. The digital broadcasting receiver according to claim 1, wherein
    the timing of execution is once per a predetermined number of times the power supply is turned off.

7. The digital broadcasting receiver according to claim 1, wherein the timing of execution is selected from one of the time when the power supply is turned on, the time when the power supply is turned off, and the time when a channel is changed.

8. The digital broadcasting receiver according to claim 2, wherein the timing of execution is selected from one of the time when the power supply is turned on, the time when the power supply is turned off, and the time when a channel is changed.

9. The digital broadcasting receiver according to claim 1, wherein
    the timing of execution is the time when the arrival of the time when correction should be executed is reported by the internal clock.

10. The digital broadcasting receiver according to claim 2, wherein
    the timing of execution is the time when the arrival of the time when correction should be executed is reported by the internal clock.

11. The digital broadcasting receiver according to claim 9, wherein
    the execution is postponed when the report on the arrival of the time when correction should be executed is received during the stand-by.

12. The digital broadcasting receiver according to claim 10, wherein
    the execution is postponed when the report on the arrival of the time when correction should be executed is received during the stand-by.

* * * * *